United States Patent
Guo

(10) Patent No.: US 9,424,204 B2
(45) Date of Patent: Aug. 23, 2016

(54) CACHING METHOD FOR DISTRIBUTED STORAGE SYSTEM, A LOCK SERVER NODE, AND A LOCK CLIENT NODE

(71) Applicant: Huawei Technologies Co., Ltd., Shenzhen (CN)

(72) Inventor: Hongxing Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 14/509,471

(22) Filed: Oct. 8, 2014

(65) Prior Publication Data
US 2015/0026417 A1    Jan. 22, 2015

Related U.S. Application Data

(63) Continuation of application No. PCT/CN2012/087842, filed on Dec. 28, 2012.

(51) Int. Cl.
| | |
|---|---|
| G06F 12/00 | (2006.01) |
| G06F 13/00 | (2006.01) |
| G06F 12/14 | (2006.01) |
| H04L 29/08 | (2006.01) |
| G06F 11/10 | (2006.01) |

(52) U.S. Cl.
CPC ........ *G06F 12/1466* (2013.01); *G06F 11/1076* (2013.01); *H04L 29/08* (2013.01); *H04L 67/1097* (2013.01); *H04L 67/2842* (2013.01); *G06F 2212/1044* (2013.01); *G06F 2212/154* (2013.01)

(58) Field of Classification Search
None
See application file for complete search history.

(56) References Cited

U.S. PATENT DOCUMENTS

| | | | |
|---|---|---|---|
| 5,717,917 A | 2/1998 | Munakata | |
| 6,490,615 B1 | 12/2002 | Dias et al. | |
| 6,671,782 B1 | 12/2003 | Menon | |
| 7,171,581 B2 * | 1/2007 | Wu | G06F 9/524 710/200 |
| 8,543,781 B2 * | 9/2013 | Rawat | H04L 41/00 710/200 |

(Continued)

FOREIGN PATENT DOCUMENTS

| | | |
|---|---|---|
| CN | 101706802 A | 5/2010 |
| CN | 102387204 A | 3/2012 |

(Continued)

OTHER PUBLICATIONS

Partial English Translation and Abstract of Japanese Patent Application No. JPA2000-187609, Mar. 2, 2016, 45 pages.

(Continued)

*Primary Examiner* — Sean D Rossiter
(74) *Attorney, Agent, or Firm* — Conley Rose, P.C.; Grant Rodolph

(57) ABSTRACT

A caching method for a distributed storage system, a lock server node, and a lock client node is disclosed. When the lock server node receives a first lock request sent by the first lock client node for locking a first data stripe, if the lock server node determines that the first lock request is a read lock request received for the first time on the first data stripe or a write lock request on the first data stripe, the lock server node records the owner of the first data stripe is the first lock client node in recorded attribute information of data stripes, and returns to the first lock client node a first response message indicating that the owner of the first data stripe is the first lock client node, and instructing the first lock client node to cache the first data stripe.

18 Claims, 11 Drawing Sheets

(56) References Cited

U.S. PATENT DOCUMENTS

| | | | |
|---|---|---|---|
| 2002/0095403 A1* | 7/2002 | Chandrasekaran | G06F 12/0804 |
| 2003/0093524 A1 | 5/2003 | Goldick | |
| 2003/0182502 A1* | 9/2003 | Kleiman | G06F 3/0613 711/114 |
| 2004/0143712 A1* | 7/2004 | Armstrong | G06F 9/544 711/152 |
| 2010/0017409 A1* | 1/2010 | Rawat | H04L 41/00 707/E17.007 |
| 2010/0174875 A1* | 7/2010 | Dice | G06F 9/52 711/152 |
| 2011/0202985 A1 | 8/2011 | Kamakura | |
| 2011/0208994 A1* | 8/2011 | Chambliss | G06F 11/1092 714/6.24 |
| 2011/0208996 A1* | 8/2011 | Hafner | G06F 9/466 714/6.24 |
| 2015/0186057 A1* | 7/2015 | Das Sharma | G06F 3/0619 714/6.3 |

FOREIGN PATENT DOCUMENTS

| | | |
|---|---|---|
| JP | H07244606 A | 9/1995 |
| JP | 2000187609 A | 7/2000 |
| JP | 20080506195 A | 2/2008 |
| WO | 0052576 A1 | 9/2000 |
| WO | 2006014573 A2 | 2/2006 |
| WO | 2010046985 A1 | 4/2010 |

OTHER PUBLICATIONS

Partial English Translation and Abstract of Japanese Patent Application No. JPA2008-506195, Mar. 2, 2016, 34 pages.
Partial English Translation and Abstract of Japanese Patent Application No. JPH07-244606, Mar. 2, 2016, 38 pages.
Foreign Communication From a Counterpart Application, Japanese Application No. 2015-514321, Japanese Office Action dated Dec. 8, 2015, 10 pages.
Foreign Communication From a Counterpart Application, Japanese Application No. 2015-514321, English Translation of Japanese Office Action dated Dec. 8, 2015, 12 pages.
Foreign Communication From a Counterpart Application, European Application No. 12891167.4, Extended European Search Report dated Apr. 20, 2015, 6 pages.
Foreign Communication From a Counterpart Application, PCT Application No. PCT/CN2012/087842, English Translation of International Search Report dated Oct. 17, 2013, 2 pages.
Foreign Communication From a Counterpart Application, PCT Application No. PCT/CN2012/087842, Written Opinion dated Oct. 17, 2013, 4 pages.

* cited by examiner

CACHING METHOD FOR DISTRIBUTED STORAGE SYSTEM, A LOCK SERVER NODE, AND A LOCK CLIENT NODE

CROSS-REFERENCE TO RELATED APPLICATIONS

This application is a continuation of International Application No. PCT/CN2012/087842, filed on Dec. 28, 2012, which is hereby incorporated by reference in its entirety.

TECHNICAL FIELD

The present invention relate to storage technologies, and in particular, to a caching method for a distributed storage system, a lock server node, and a lock client node.

BACKGROUND

In a distributed storage system, multiple node devices are connected to form a cluster, where the multiple node devices all have a data storage function. All node devices are connected through a front-end network and a back-end network. The front-end network is used for exchange of requests and data between user services and the distributed storage system, and the back-end network is used for exchange of requests and data between node devices inside the distributed storage system.

In a distributed storage system, user data is stripped into stripes, and then data strips of a stripe are distributed to hard disks of different node devices and stored there. When accessing user data, an application server first sends an access request to one node device through the front-end network, and then, the node device reads, through the back-end network, data strips where the user data is located to the local node device, restores the data strips to the user data using a Redundant Array of Independent Disks (RAID) algorithm or an erasure code algorithm, and returns the user data to the application server through the front-end network.

In the above user data access process, a caching technology is used. In one caching method, each node device caches in its cache hot-spot data blocks of the local node device. When a node device needs to obtain a data stripe, the node device needs to obtain data blocks that constitute the data stripe from caches of node devices. If the required data blocks cannot be obtained from the caches of the node devices, the node device further needs to access hard disks of the node devices and obtain the data blocks from the hard disks. Then, the node device aggregates, rebuilds and performs redundancy check on the obtained data blocks to obtain the data stripe. In another caching method, each node device caches in its cache hot-spot file data stripes obtained according to statistics by the node device. When a node device needs to obtain a data stripe, the node device first obtains the data stripe from its own cache. If the required data stripe cannot be obtained from the cache of the node device, the node device needs to obtain the data strips of the data stripe from hard disks of the node devices in the distributed storage system.

At present, the data caching technology adopted in a distributed storage system is one of the aforesaid two caching methods or a combination thereof. Using the current caching methods in a distributed storage system, each node device determines, according to access statistics, hot-spot content among content stored in its hard disk and caches the hot-spot content in a cache. Because each node device performs the caching independently, it is possible that the same content is cached in different node devices. As a result, the cache utilization rate of node devices is low.

SUMMARY

In one aspect, the present invention provides a caching method for a distributed storage system, a lock server node, and a lock client node, in order to overcome the defect in the prior art and increase the cache utilization rate of node devices.

According to a first aspect, an embodiment of the present invention provides a caching method performed by a lock server node in a distributed storage system which includes the lock server node and a plurality of lock client nodes including a first lock client node. In the method, the lock server node receives a first lock request sent by the first lock client node for locking a first data stripe. The first lock request contains an identity (ID) of the first data stripe. The lock server node determines that the first lock request is a read lock request received for the first time on the first data stripe or a write lock request on the first data stripe. The lock server node records the owner of the first data stripe is the first lock client node in recorded attribute information of data stripes, and returns to the first lock client node a first response message indicating that the owner of the first data stripe is the first lock client node, and instructing the first lock client node to cache the first data stripe.

According to a second aspect, an embodiment of the present invention provides a caching method performed by a first lock client node in a distributed storage system which includes a lock server node and a plurality of lock client nodes including the first lock client node. In the method, the first lock client node sends a first lock request to the lock server node for requesting to lock a first data stripe. After the first lock client node receives a first response message which contains an ID of the owner of the first data stripe and is sent by the lock server node, if the first lock client node determines that the ID of the owner of the first data stripe is an ID of the first lock client node, the first lock client node obtains data strips of the first data stripe from other lock client nodes in the distributed storage system. Then, the first lock client node constructs the first data stripe according to the data strips and caches the first data stripe.

According to a third aspect, an embodiment of the present invention provides a lock server node in a distributed storage system which includes the lock server node and a plurality of lock client nodes including a first lock client node. The lock server includes a communication interface and a processor. The communication interface is configured to connect to the lock client nodes. The processor is configured to receive a first lock request, which is sent by the first lock client node and contains an ID of the first data stripe, for locking a first data stripe. After determining the first lock request is a read lock request received for the first time on the first data stripe or a write lock request on the first data stripe, the processor is configured to record the owner of the first data stripe is the first lock client node in recorded attribute information of data stripes, and is configured to return to the first lock client node a first response message indicating that the owner of the first data stripe is the first lock client node, and instructing the first lock client node to cache the first data stripe.

According to a fourth aspect, an embodiment of the present invention provides a lock client node. The lock client node includes a communication interface and a processor. The communication interface is configured to connect to a lock server node and other lock client nodes in a distributed storage system. The processor is configured to send a first lock request to the lock server node. After receiving a first response message which contains an ID of the owner of the first data stripe and is sent by the lock server node, the processor is configured to determine whether the ID of the owner of the first data stripe is an ID of the lock client node. If the ID of the owner of the first data stripe is an ID of the lock client node, the processor is configured to obtain data strips of the first data stripe from other lock client nodes in the distributed storage system. Then, the processor is configured to construct the first data stripe according to the data strips and cache the first data stripe.

According to another aspect, an embodiment of the present invention provides a computer readable medium, including a computer execution instruction, where the computer execution instruction is used to instruct a lock server node to execute any one of the above methods.

According to another aspect, an embodiment of the present invention provides a computer readable medium, including a computer execution instruction, where the computer execution instruction is used to instruct a lock client node to execute any one of the above methods.

According to the cashing method provided in the embodiments of the present invention, when the lock server node receives a first lock request sent by the first lock client node for locking a first data stripe, if the lock server node determines that the first lock request is a read lock request received for the first time on the first data stripe or a write lock request on the first data stripe, the lock server node records the owner of the first data stripe is the first lock client node in recorded attribute information of data stripes, and returns to the first lock client node a first response message. The first response message is used to indicate the owner of the first data stripe is the first lock client node, and instruct the first lock client node to cache the first data stripe. Through the method provided by the embodiments of the present invention, the first data stripe is cached only once in its owner (the first lock client node) in the entire distributed storage system, and other lock client nodes can read the data stripe from the owner. This avoids the problem that the same data stripe is cached in different node devices and increases the cache utilization rate of node devices.

BRIEF DESCRIPTION OF DRAWINGS

To illustrate the technical solutions in the embodiments of the present invention more clearly, the following briefly introduces the accompanying drawings required for describing the embodiments or the prior art. The accompanying drawings in the following description show merely some embodiments of the present invention.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention.

The embodiments hereinafter of the present invention are described by taking a caching process as an example where data is accessed after the data is stored in hard disks of node devices in a distributed storage system.

Figure 1:
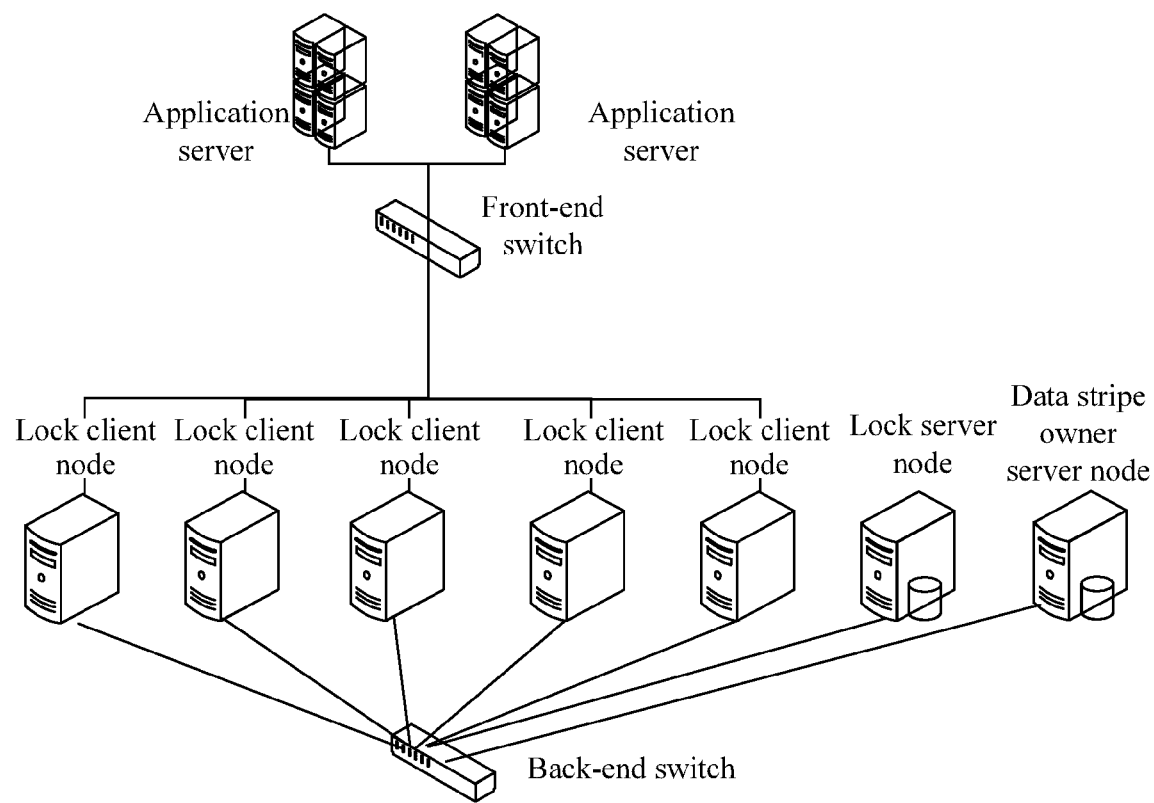
FIG. 1 is a schematic structural diagram of a distributed storage system according to Embodiment 1 of the present invention.

FIG. 1 is a schematic structural diagram of a distributed storage system according to Embodiment 1 of the present invention. The distributed storage system in Embodiment 1 of the present invention is applicable to caching methods in the embodiments hereinafter of the present invention. In the prior art, a distributed storage system includes multiple lock client nodes and multiple lock server nodes. In the distributed storage system according to Embodiment 1 of the present invention, one or more data stripe owner server nodes are added on the basis of the distributed storage system in the prior art. One operation process involves multiple lock client nodes, one lock server node, and one data stripe owner server node. As shown in FIG. 1, multiple lock client nodes, one lock server node, and one data stripe owner server node in the distributed storage system are shown in FIG. 1, while other lock server nodes and other data stripe owner server nodes are not shown. In the embodiments of the present invention, it is assumed that a lock client node, a lock server node, and a data stripe owner server node are set separately. In an actual application, one lock client node, one lock server node, and one data stripe owner server node may be simultaneously set on each node device, and in each operation process, a lock server node set on one node device acts as a lock server node of the operation, and a data stripe owner server node set on the node device acts as a data stripe owner server node of the operation.

In an actual application, a data stripe owner server node and a lock server node may be set separately and execute their respective functions. Or, a data stripe owner server node and a lock server node may be set in combination, that is, a lock server node in the prior art is improved to execute operations executed by a data stripe owner server node disclosed in the embodiments of the present invention on the basis of operations executed by the lock server node in the prior art.

A caching method in a case where a data stripe owner server node and a lock server node are set separately is described in the following using Embodiment 2 and Embodiment 3 of the present invention.

Figure 2A:
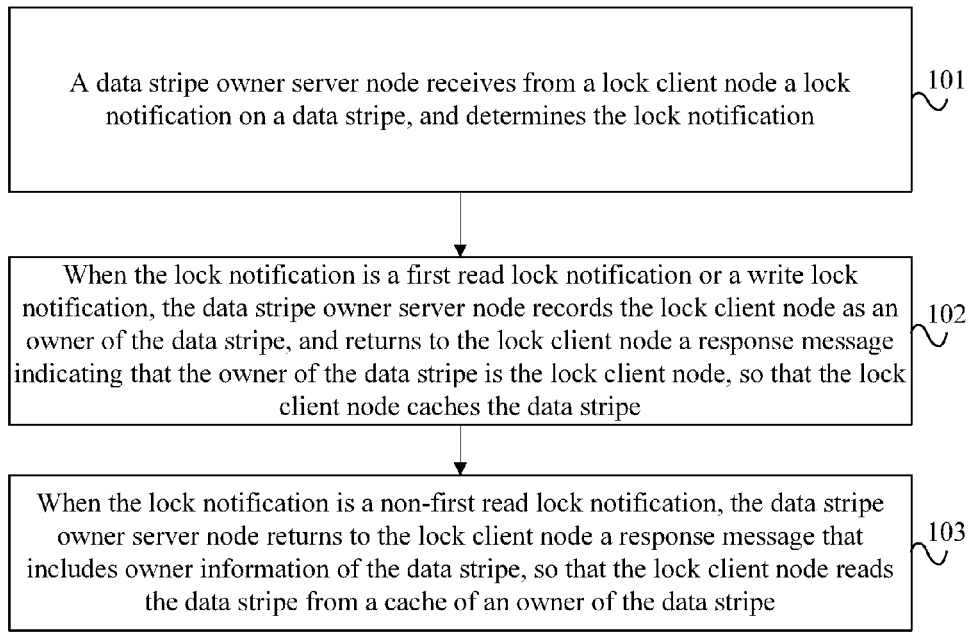
FIG. 2A is a schematic flowchart of a caching method for a distributed storage system according to Embodiment 2 of the present invention.
Figure 2B:
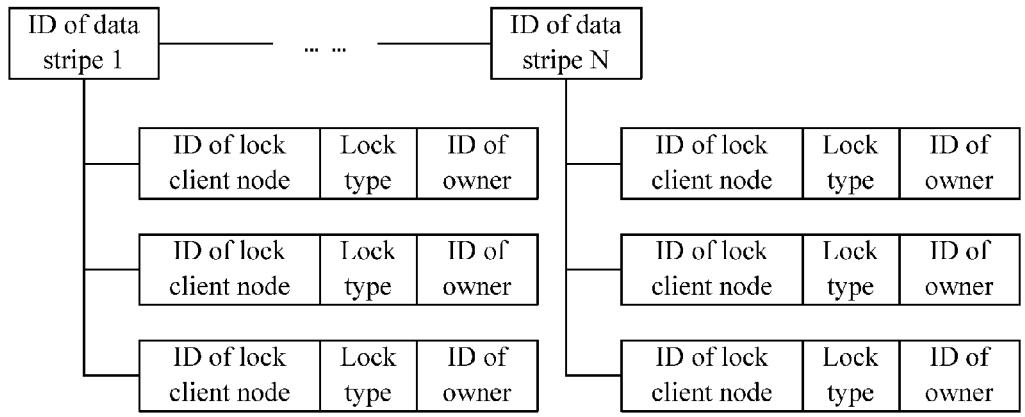
FIG. 2B is a schematic structural diagram of attribute information of N data stripes according to Embodiment 2 of the present invention.

FIG. 2A is a schematic flowchart of a caching method for a distributed storage system according to Embodiment 2 of the present invention. As shown in FIGS. 2A-2B, the method includes the following process.

Step 101: A data stripe owner server node receives from a lock client node a lock notification on a data stripe, and determines the lock notification.

Step 102: When the lock notification is a read lock notification received for the first time or a write lock notification, the data stripe owner server node records the lock client node as an owner of the data stripe, and returns to the lock client node a response message indicating that the owner of the data stripe is the lock client node, so that the lock client node caches the data stripe.

In this step, it is assumed that the data stripe owner server node receives from a first lock client node a read lock notification received for the first time on a data stripe or a write lock notification on the data stripe. The data stripe owner server node records the first lock client node as an owner of the data stripe and returns to the first lock client node a response message indicating that the owner of the data stripe is the first lock client node, so that the first lock client node caches the data stripe. After obtaining a read lock authorization or a write lock authorization from a lock server node, the first lock client node sends a lock notification to the owner server node, where the notification carries an identity of the data stripe corresponding to the lock and carries a read lock identifier when the lock is a read lock or a write lock identifier when the lock is a write lock, to notify, through the lock notification, the owner server node that the first lock client node has obtained a read lock or a write lock on the data stripe. Attribute information of data stripes is recorded in the data stripe owner server node. The owner server node receives the lock notification sent by the first lock client node and searches recorded attribute information of data stripes according to the data stripe identity carried in the lock notification. If the lock notification carries a read lock identifier and a read lock corresponding to the data stripe is not found in the recorded attribute information of the data stripes, the owner server node determines that a read lock notification on the data stripe is received for the first time.

FIG. 2B is a schematic structural diagram of attribute information of N data stripes in Embodiment 2 of the present invention. As shown in FIG. 2B, in attribute information of each data stripe, an ID of the data stripe is recorded and correspondingly, an ID of a lock client node currently holding a lock on the data stripe, a lock type, and an ID of an owner of the data stripe are recorded. The lock type is used to indicate that the lock of the data stripe is a read lock or a write lock. A lock client node that holds a read lock on a data stripe can read the data stripe, while a lock client node that holds a write lock on a data stripe can write or modify the data stripe. A write lock takes priority over a read lock. When a lock client node holds a read lock on a data stripe, other lock client nodes may also hold read locks on the data stripe; and when a lock client node holds a write lock on a data stripe, other lock client nodes are prohibited from holding read locks or write locks on the data stripe. It should be noted that, as an example, in the attribute information of each data stripe shown in FIG. 2B, three lock client nodes currently holding locks on the data stripe are recorded. It is understandable that the embodiment of the present invention does not limit lock client nodes currently holding locks on a data stripe.

Step 103: When the lock notification is a read lock notification which is not received for the first time, the data stripe owner server node returns to the lock client node a response message that includes owner information of the data stripe, so that the lock client node reads the data stripe from a cache of an owner of the data stripe.

In this step, assuming that the data stripe owner server node receives from a second lock client node a read lock notification on the data stripe which is not received for the first time, the data stripe owner server node returns to the second lock client node a response message indicating that the owner of the data stripe is the first lock client node, so that the second lock client node reads the data stripe from a cache of the first lock client node.

In the above embodiment, when receiving a read lock notification received for the first time or a write lock notification on a data stripe, the data stripe owner server node records the lock client node that initiates the notification as an owner of the data stripe, and the lock client node caches the data stripe; and, when receiving a read lock notification on the data stripe which is not received for the first time, the data stripe owner server node notifies, according to the record, the lock client node that initiates the notification of the owner of the data stripe, and the lock client node that initiates the notification reads the data stripe from a cache of the owner. The data stripe owner server node records and notifies an owner of a data stripe, so that one data stripe is cached only once in a lock client node corresponding to the owner of the data stripe in the entire distributed storage system, and lock client nodes can read the data stripe from the owner. This avoids the problem that the same data stripe is cached in different node devices and increases the cache utilization rate of node devices.

On the basis of the above technical solution, further, after step 101, the method may include, when the lock notification is a read lock notification, searching, by the data stripe owner server node, the recorded attribute information of the data stripes for attribute information of the data stripe, and if the attribute information of the data stripe is not found, determining that the read lock notification is a read lock notification received for the first time.

On the basis of the above technical solution, after the returning by the data stripe owner server node, to the first lock client node the response message indicating that the owner of the data stripe is the first lock client node, the method further includes receiving, by the data stripe owner server node from the first lock client node, a request message for changing the owner of the data stripe to a third lock client node; changing, by the data stripe owner server node, the owner of the data stripe to the third lock client node; and returning, by the data stripe owner server node the first lock client node, a response message indicating success in changing the owner of the data stripe, so that the first lock client node deletes the data stripe from a local cache and the third lock client node caches the data stripe.

Using the above implementation manner, when the first lock client node is short of memory and cannot store the data stripe, the ownership of the data stripe is transferred to the third lock client node. This implements dynamic change of the owner of the data stripe and relieves the cache load of the first lock client node, thereby implementing better load balancing in data stripe caching.

On the basis of the above technical solution, further, when the data stripe owner server node is integrated with a lock server node device, the read lock notification may be a read lock request and the write lock notification may be a write lock request. Correspondingly, the returning to the first lock client node a response message indicating that the owner of the data stripe is the first lock client node further includes returning to the first lock client node a lock success response message. The returning to a second client node a response message indicating that the owner of the data stripe is the first lock client node further includes returning to the second lock client node a lock success response message.

By integrating the data stripe owner server node in a lock server node device, when a lock client node sends a read lock notification or a write lock notification to the data stripe owner server node, the notification also carries a read lock request or a write lock request to the lock server node device. This avoids sending another read lock request or write lock request to the lock server node device, reduces signaling between system devices, and increases the efficiency in reading or writing data stripes.

Figure 3:
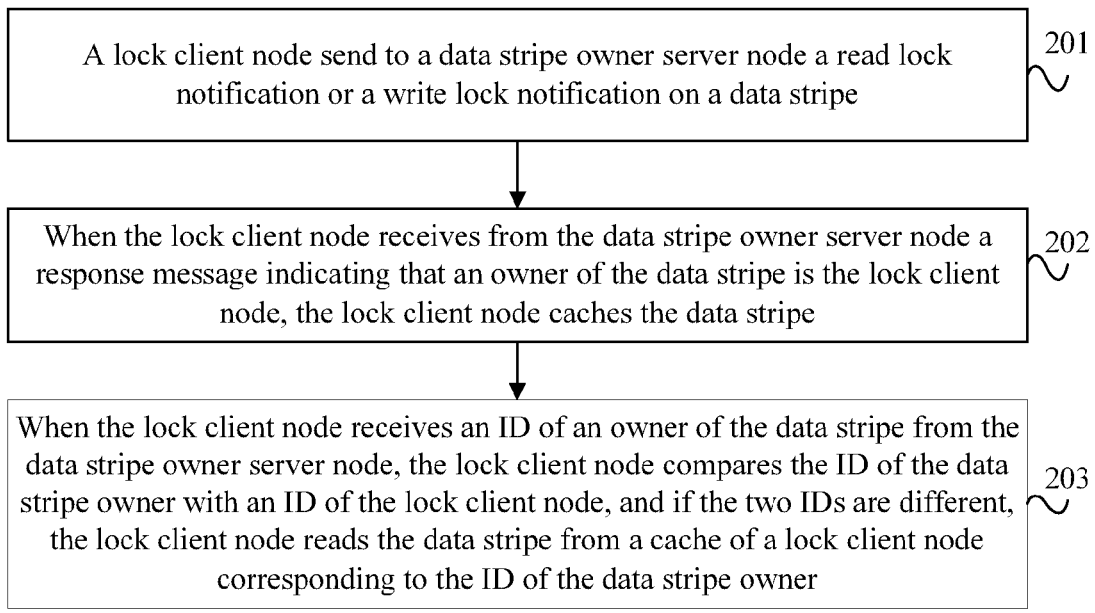
FIG. 3 is a schematic flowchart of a caching method for a distributed storage system according to Embodiment 3 of the present invention.

FIG. 3 is a schematic flowchart of a caching method for a distributed storage system according to Embodiment 3 of the present invention. As shown in FIG. 3, the method includes the following process.

Step 201: A lock client node sends to a data stripe owner server node a read lock notification or a write lock notification on a data stripe.

Step 202: The lock client node receives from the data stripe owner server node a response message indicating that an owner of the data stripe is the lock client node, and the lock client node caches the data stripe.

Step 203: When the lock client node receives an ID of the data stripe owner from the data stripe owner server node, the lock client node compares the ID of the data stripe owner with an ID of the lock client node, and if the two IDs are different, the lock client node reads the data stripe from a cache of a lock client node corresponding to the ID of the data stripe owner.

On the basis of the above technical solution, further, after the sending, by the lock client node to the data stripe owner server node, a read lock notification or a write lock notification on a data stripe, before the lock client node receives from the data stripe owner server node the response message indicating that the owner of the data stripe is the lock client node, the method includes, when receiving a read lock notification received for the first time on the data stripe or a write lock notification on the data stripe, recording, by the data stripe owner server node, the lock client node as the owner of the data stripe.

On the basis of the above technical solution, further, the method further includes, if the lock notification sent by the lock client node to the owner server node is a write lock notification on the data stripe, caching, by the lock client node, the data stripe and then sending a degrade lock request to a lock server node, so that the lock server node modifies the record to that the lock client node holds a read lock on the data stripe. After a lock client node that holds a write lock caches the data stripe locally, if the lock client node always holds the write lock, when another lock client requests a read lock, the write lock needs to be recalled. In the embodiment of the present invention, after the lock client node that holds the write lock caches the data stripe locally, the lock client node sends a degrade request actively to the lock server node to degrade the write lock to a read lock, so that when another lock client requests a read lock, it is unnecessary to recall the write lock. This saves the time to initiate a read lock operation subsequently and increases the efficiency of caching processing.

On the basis of the above technical solution, further, before the sending, by the lock client node to the data stripe owner server node, a read lock notification or a write lock notification on the data stripe, the method includes receiving, by the lock client node from an application server, a read request or a write request on the data stripe; searching locally, by the lock client node, for the read lock or the write lock on the data stripe; if the read lock or the write lock on the data stripe is found, determining the owner of the data stripe according to the read lock or a write lock on the data stripe, and reading the data stripe from or writing the data stripe to the owner of the data stripe; and if the read lock or the write lock on the data stripe is not found, executing the step of sending, by a lock client node to a data stripe owner server node a read lock notification or a write lock notification on a data stripe.

On the basis of the above technical solution, the method further includes, when a cache deletion rate of the lock client node in a unit time is greater than or equal to a preset proportion of a total cache volume of the lock client node, sending, by the lock client node to the data stripe owner server node, a request message for changing the owner of the data stripe to a target lock client node, so that the data stripe owner server node changes the owner of the data stripe to the target lock client node; and receiving, by the lock client node from the data stripe owner server node, a response message indicating success in changing the owner of the data stripe, deleting the data stripe from a local cache, and sending the data stripe to the target lock client node, so that the target lock client node caches the data stripe. Data stripes migrate dynamically between caches of lock client nodes. This overcomes the defect that the cache utilization efficiency is low because of frequent cache deletion on the lock client node and can maintain balanced cache utilization on each lock client node in the entire system, which increases the cache utilization rate.

On the basis of the above technical solution, further, the reading, by the lock client node the data stripe from a lock client node corresponding to the ID of the data stripe owner includes sending, by the lock client node to the lock client node corresponding to the ID of the data stripe owner, a read request on the data stripe, so that the lock client node corresponding to the ID of the data stripe owner searches locally cached data for the data stripe, and if the data stripe is found, returns the data stripe to the lock client node, and otherwise, reads data strips of the data stripe from lock client nodes in the distributed storage system, constructs the data stripe, and returns the data stripe to the lock client node.

In Embodiment 3 of the present invention, when a lock client node sends a read lock notification received for the first time or a write lock notification on a data stripe, the lock client node caches the data stripe, and the data stripe owner server node records the lock client node as an owner of the data stripe; and, when a lock client node sends a read lock notification on the data stripe which is not received for the first time, the data stripe owner server node notifies, according to the record, the lock client node of the owner of the data stripe, and the lock client node reads the data stripe from a cache of the owner. The data stripe owner server node records and notifies an owner of a data stripe, so that one data stripe is cached only once in its owner in the entire distributed storage system, and lock client nodes can read the data stripe from the owner. This avoids the problem that the same data stripe is cached in different node devices and increases the cache utilization rate of node devices.

The caching method in the case where a data stripe owner server node and a lock server node are set separately is described using Embodiment 2 and Embodiment 3 of the present invention. In an actual application, an owner server node and a lock server node may further be combined, where one node is configured to execute operations of both the owner server node and the lock server node. For example, a lock server node in the prior art may be improved to execute operations executed by the owner server node disclosed in the embodiments of the present invention on the basis of operations executed by the lock server node in the prior art. Hereinafter, the caching method disclosed by the present invention is described further in fourth to eighth embodiments of the present invention by assuming that one node executes operations of both an owner server node and a lock server node, that is, the above improved lock server node is configured to execute operations of a lock server node in the prior art and operations of the owner server node disclosed in the embodiments of the present invention. A lock server node described in the fourth to eighth embodiments of the present invention is the above improved lock server node, and a lock request sent by a lock client node to the lock server node is taken as a lock notification. For example, if a lock client node sends a read lock request to the lock server node, the lock server node executes operations of a lock server node in the prior art, and also, the lock server node takes the read lock request as a read lock notification and executes operations of the owner server node disclosed by the present invention. Similarly, if a lock client node sends a write lock request to the lock server node, the lock server node executes operations of a lock server node in the prior art, and also, the lock server node takes the write lock request as a write lock notification and executes operations of the owner server node disclosed by the present invention.

Figure 4:
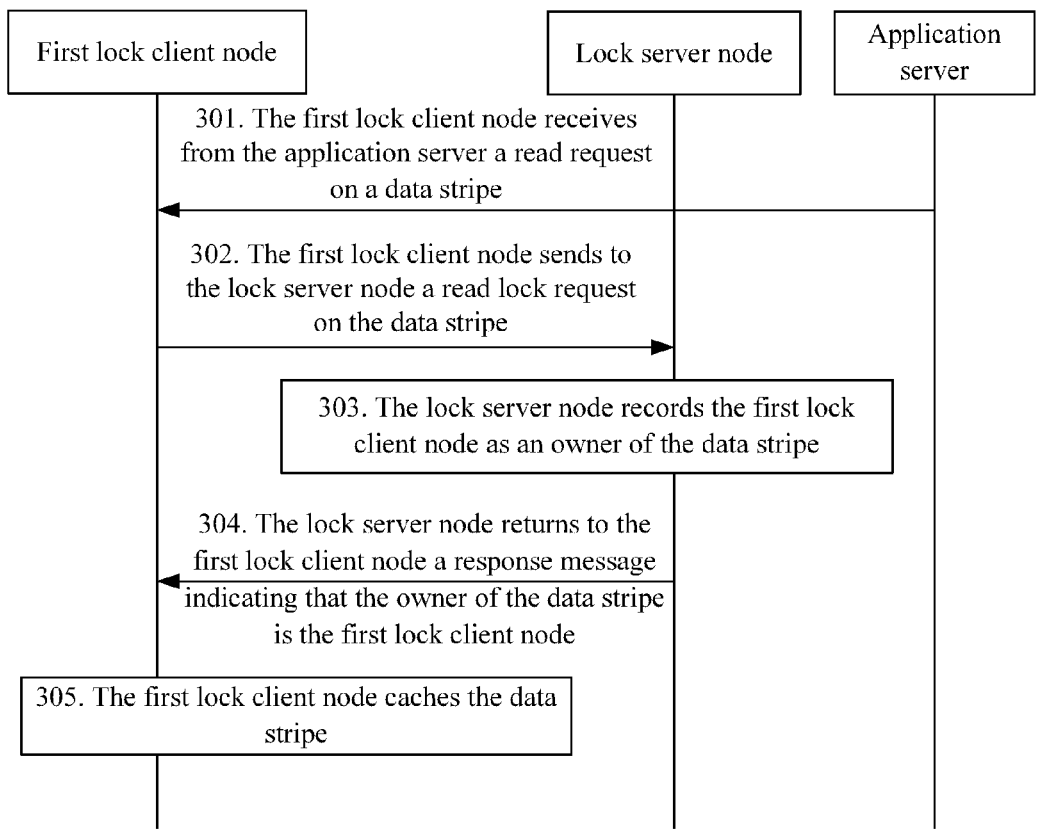
FIG. 4 is a signaling flowchart of a caching method for a distributed storage system according to Embodiment 4 of the present invention.

FIG. 4 is a signaling flowchart of a caching method for a distributed storage system according to Embodiment 4 of the present invention. In Embodiment 4 of the present invention, it is assumed that, in the distributed storage system, a read lock operation on a data stripe appears for the first time or a read lock operation on the data stripe appears for the first time after the data stripe is deleted. As shown in FIG. 4, the method includes the following process.

Step 301: A first lock client node receives from an application server a read request on a data stripe.

In this step, after the first lock client node receives from the application server the read request on the data stripe, the first lock client node searches locally for a read lock on the data stripe, and if the read lock is found, reads the data stripe from an lock client node which is an owner of the data stripe and indicated in the read lock on the data stripe. Otherwise, step 302 is executed. In the embodiment of the present invention, it is assumed that the read lock is not found.

Step 302: The first lock client node sends to a lock server node a read lock request on the data stripe.

Step 303: The lock server node records the first lock client node as an owner of the data stripe.

In this step, after receiving a stripe lock request, the lock server node first checks whether attribute information of the data stripe exists in the record, and if the attribute information of the data stripe does not exist, generates an attribute information record of the data stripe, and otherwise, checks the attribute information of the data stripe for information on a lock client node that holds a lock. In Embodiment 4 of the present invention, it is assumed that the attribute information of the data stripe does not exist. If no record related to the data stripe exists, it indicates that the data stripe is requested for the first time in the system or requested for the first time after deletion. The lock server node adds information related to the first lock client node that currently requests a lock to the record, records the first lock client node as an owner of the data stripe, and records an owner ID corresponding to the first lock client node as an ID of the first lock client node.

Step 304: The lock server node returns to the first lock client node a response message indicating that the owner of the data stripe is the first lock client node.

In this step, the lock server nodes returns a lock success response message to the first lock client node, where the message indicates to the first lock client node that the owner of the data stripe is the first lock client node, and the first lock client node records locally that the owner ID of the data stripe is the ID of the first lock client node.

Step 305: The first lock client node caches the data stripe.

In this step, the first lock client node discovers, according to the information returned by the lock server node, that the first lock client node itself is the owner of the data stripe. The first lock client node requests cache space from a local global uniform cache, reads data strips of the data stripe from other lock client nodes, constructs the data stripe in the local global uniform cache, and returns the data stripe to the application server. After reading the data strips of the data stripe from the other lock client nodes, constructing the data stripe according to the data strips, and completing the construction, the first lock client node can obtain the data strip and redundancy data of the data strip. In Embodiment 4 of the present invention, the first lock client node only caches the data stripe but not caches the redundancy data of the data stripe, which further increases the cache utilization rate of nodes in the distributed storage system. In other embodiments of the present invention, when a lock client node caches a data stripe, this manner may also be adopted to perform caching.

Figure 5:
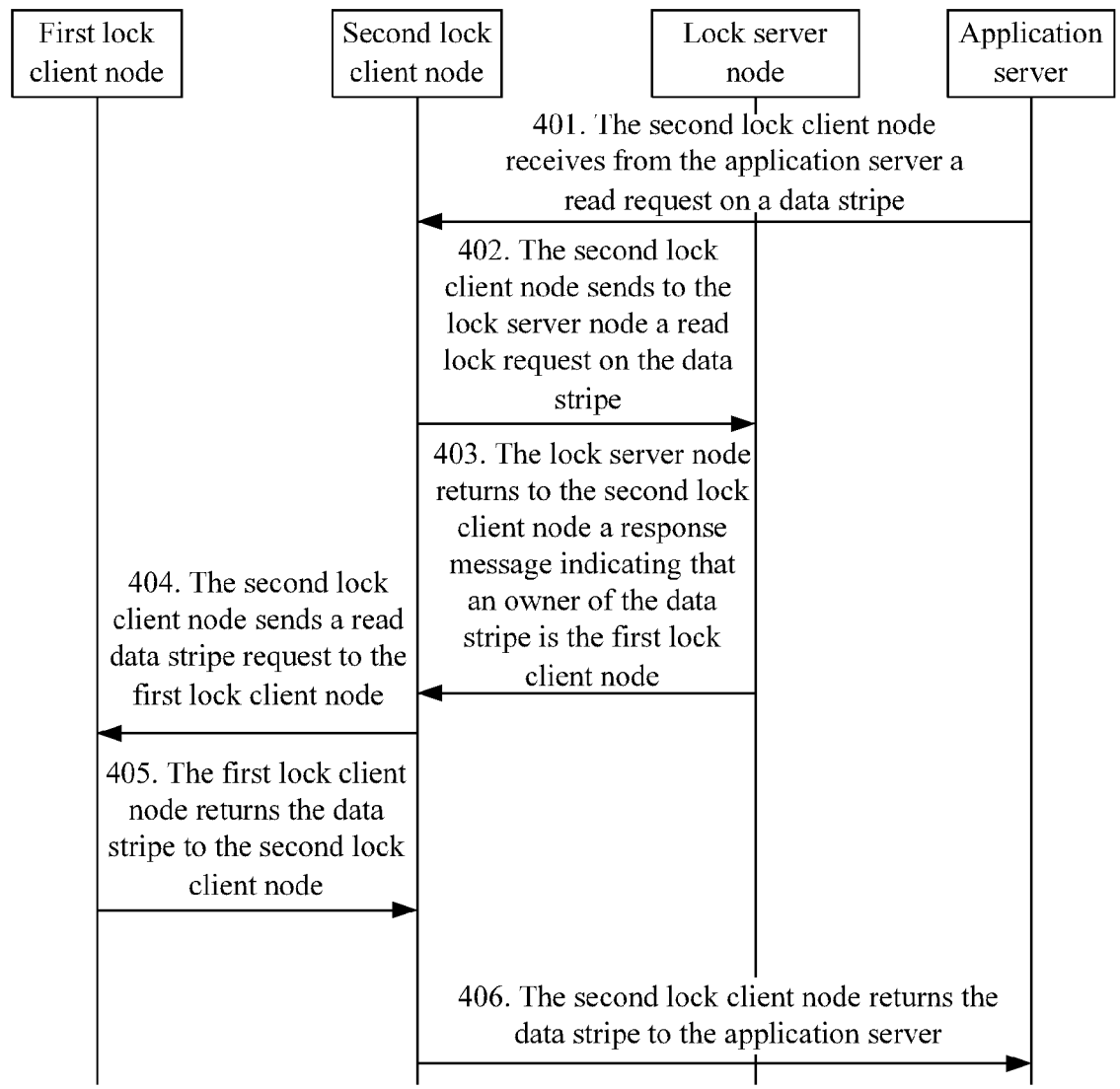
FIG. 5 is a signaling flowchart of a caching method for a distributed storage system according to Embodiment 5 of the present invention.

FIG. 5 is a signaling flowchart of a caching method for a distributed storage system according to Embodiment 5 of the present invention. In Embodiment 5 of the present invention, it is assumed that, in the distributed storage system, a second lock client node reads a data stripe after a first lock client node caches the data stripe. As shown in FIG. 5, the method includes the following process.

Step 401: The second lock client node receives from an application server a read request on the data stripe.

In this step, the second lock client node searches locally for a read lock on the data stripe, and if the read lock is found, reads the data stripe from a lock client node which is an owner of the data stripe and indicated in the read lock of the data stripe. Otherwise, step 402 is executed. In the embodiment of the present invention, it is assumed that the read lock is not found.

Step 402: The second lock client node sends to a lock server node a read lock request on the data stripe.

Step 403: The lock server node returns to the second lock client node a response message indicating that the owner of the data stripe is the first lock client node.

In this step, after receiving a stripe lock request, the lock server node first checks whether attribute information of the data stripe exists in the record, and if the attribute information of the data stripe does not exist, generates an attribute information record of the data stripe, and otherwise, checks the attribute information of the data stripe for information on a lock client node that holds a lock. In Embodiment 5 of the present invention, it is assumed that attribute information of the data stripe exists. If the attribute information of the data stripe exists, the lock server node can learn the owner of the data stripe according to the attribute information. Assuming that the owner of the data stripe is the first lock client node, the lock server node adds an ID of the second lock client node that currently requests a lock to the attribute information of the data stripe, and sets an owner flag corresponding to the ID of the second lock client node to a preset value that indicates a non-owner. The lock server node returns a lock success response message to the second lock client node, where the message indicates to the second lock client node that the owner of the data stripe is the first lock client node.

After step 403, the second lock client node reads the data stripe from a cache of the first lock client node, which includes the following steps.

Step 404: The second lock client node sends a read request on the data stripe to the first lock client node.

In this step, the second lock client node records locally, according to the information returned by the lock server node, that the owner ID of the data stripe is an ID of the first lock client node. The second lock client node learns that the second lock client node is not the owner of the data stripe, and then generates a read request on the data stripe and sends the request to the first lock client node through a back-end network.

Step 405: The first lock client node returns the data stripe to the second lock client node.

In this step, after receiving the read request on the data stripe of the second lock client node, the first lock client node obtains the data stripe from a local global uniform cache, and returns the data stripe directly to the second lock client node.

Step 406: The second lock client node returns the data stripe to the application server.

In this step, the second lock client node sends the data stripe to the application server after receiving a read data stripe response of the first lock client node.

Figure 6:
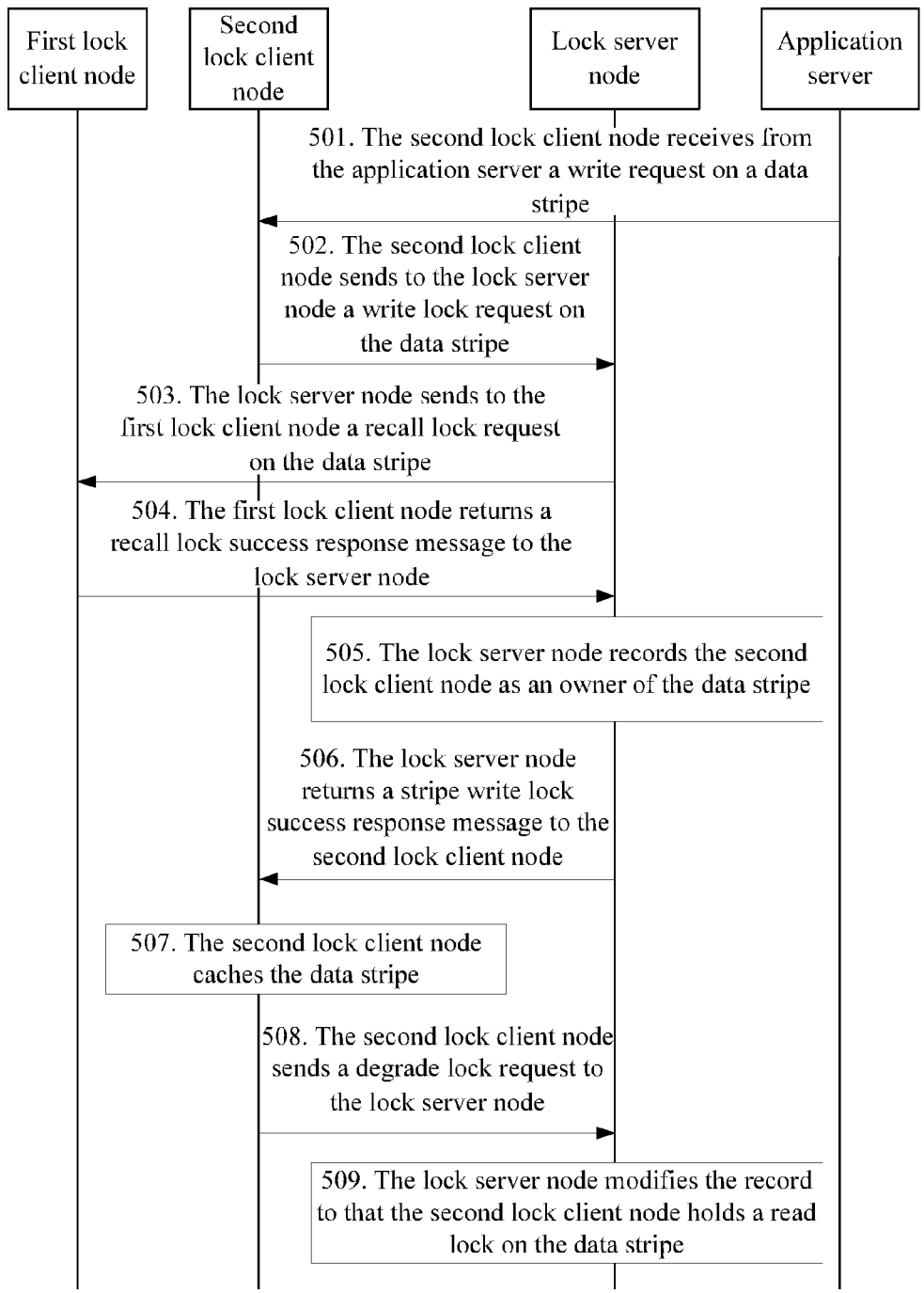
FIG. 6 is a signaling flowchart of a caching method for a distributed storage system according to Embodiment 6 of the present invention.

FIG. 6 is a signaling flowchart of a caching method for a distributed storage system according to Embodiment 6 of the present invention. In Embodiment 6 of the present invention, it is assumed that, in the distributed storage system, a second lock client node writes a data stripe after a first lock client node caches the data stripe. As shown in FIG. 6, the method includes the following process.

Step 501: The second lock client node receives from an application server a write request on the data stripe.

In this step, after the second lock client node receives from the application server the write request on the data stripe, the second lock client node searches locally for a write lock on the data stripe, and if the write lock is found, writes the data stripe to a lock client node which is an owner of the data stripe and indicated in the write lock on the data stripe. If the second lock client node finds the write lock on the data stripe locally, it indicates that, before this time, the lock server node has already granted the write lock on the data stripe to the second lock client node. According to a write lock granting rule, before granting the write lock to the second lock client node, the lock server node records the owner of the data stripe as the second lock client node. Therefore, if the second lock client node finds the write lock on the data stripe locally, the lock client node which is the owner of the data stripe and indicated in the write lock of the data stripe is the second lock client node. If the second lock client node does not find the write lock on the data stripe locally, step 502 is executed. In the embodiment of the present invention, it is assumed that the write lock is not found.

Step 502: The second lock client node sends to a lock server node a write lock request on the data stripe.

Step 503: The lock server node sends to the first lock client node a lock recall request on the data stripe.

In this step, after receiving a stripe lock request, the lock server node first checks whether attribute information of the data stripe exists in the record, and if the attribute information of the data stripe does not exist, generates an attribute information record of the data stripe, and otherwise, checks the attribute information of the data stripe for information on a lock client node that holds a lock. In Embodiment 6 of the present invention, it is assumed that the attribute information of the data stripe exists. If the attribute information of the data stripe exists, the lock server node can learn lock client nodes that hold a read lock or the write lock on the data stripe. The lock server node generates requests for recalling the locks of the data stripe held by these lock client nodes and sends the requests to the corresponding lock client nodes. Assuming that the first lock client node holds a read lock on the data stripe, the lock server node generates a request for recalling the read lock of the data stripe held by the first lock client node, and sends the request to the first lock client node.

Step 504: The first lock client node returns a lock recall success response message to the lock server node.

In this step, after receiving the lock recall request, the first lock client node first checks whether the lock is still in use. If the lock is not in use, the first lock client node directly returns the lock recall success response message to the lock server node. If the lock is in use, the first lock client node waits for release of the lock and then returns the lock recall success response message to the lock server node. If the first lock client node is the owner of the data stripe, before sending the lock recall success response message, the first lock client node first deletes the data stripe in a global uniform cache of the first lock client node from the global uniform cache.

Step 505: The lock server node records the second lock client node as the owner of the data stripe.

In this step, after receiving the lock recall success response message, the lock server node records the second lock client node that requests the write lock of the data stripe in the attribute information of the data stripe, and records the second lock client node as the owner of the data stripe.

Step 506: The lock server node returns a stripe write lock success response message to the second lock client node.

Step 507: The second lock client node caches the data stripe.

In this step, after receiving the stripe write lock success response message of the lock server node, the second lock client node requests stripe cache space from the local global uniform cache, receives from the application server the data stripe that needs to be written and stores the data stripe in the local global uniform cache, and then writes data strips of the data stripe to the corresponding lock client nodes.

Step 508: The second lock client node sends a degrade lock request to the lock server node.

In this step, after the data writing is successful, the second lock client node generates a degrade lock request and sends the request to the lock server node, where the request indicates degrading of the write lock on the data stripe to a read lock.

Step 509: The lock server node modifies the record to that the second lock client node holds a read lock on the data stripe.

In this step, after receiving the degrade lock request, the lock server node modifies a lock type corresponding to the second lock client node from "write lock" to "read lock".

Figure 7:
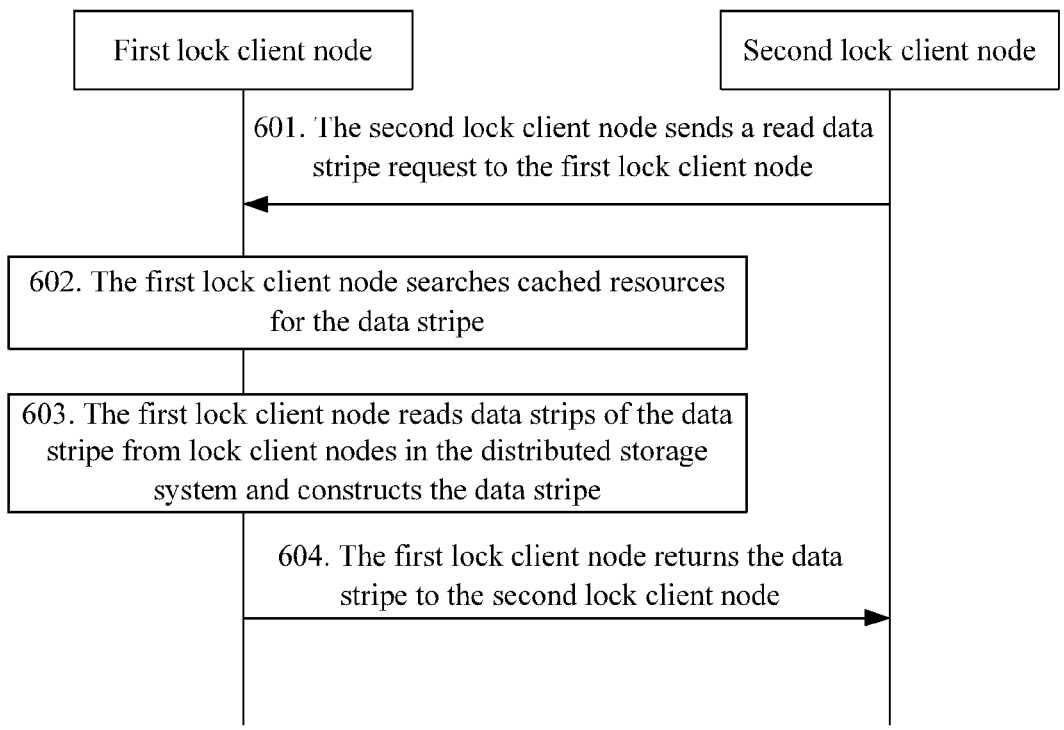
FIG. 7 is a signaling flowchart of a caching method for a distributed storage system according to Embodiment 7 of the present invention.

FIG. 7 is a signaling flowchart of a caching method for a distributed storage system according to Embodiment 7 of the present invention. In Embodiment 7 of the present invention, it is assumed that, when data is deleted because a first lock client node which is an owner is short of caching space, a second lock client node reads the data stripe from the first lock client node. As shown in FIG. 7, the method includes the following process.

Step 601: The second lock client node sends a read request on the data stripe to the first lock client node.

In this step, an owner of a data stripe is the first lock client node. When reading the data stripe, the second lock client node learns that the first lock client node is the owner, and then sends a read request on the data stripe to the first lock client node, to request reading of the data stripe from a cache of the first lock client node.

Step 602: The first lock client node searches cached resources for the data stripe.

In this step, the first lock client node first searches cached resources for the data stripe. If the data stripe is found, the first lock client node directly returns the data stripe to the second lock client node; and if the data stripe is not found, it indicates that data deletion occurs on the first lock client node, and the data stripe has been deleted, and step 603 will be executed. In Embodiment 7 of the present invention, it is assumed that the data stripe is not found.

Step 603: The first lock client node reads data strips of the data stripe from lock client nodes in the distributed storage system and constructs the data stripe.

In this step, if the first lock client node does not find the data stripe in its cache, the first lock client node actively initiates data read requests to lock client nodes in the distributed storage system, reads data strips of the data stripe from the lock client nodes, and reconstructs the data stripe in a global cache of the first lock client node.

Step 604: The first lock client node returns the data stripe to the second lock client node.

Figure 8:
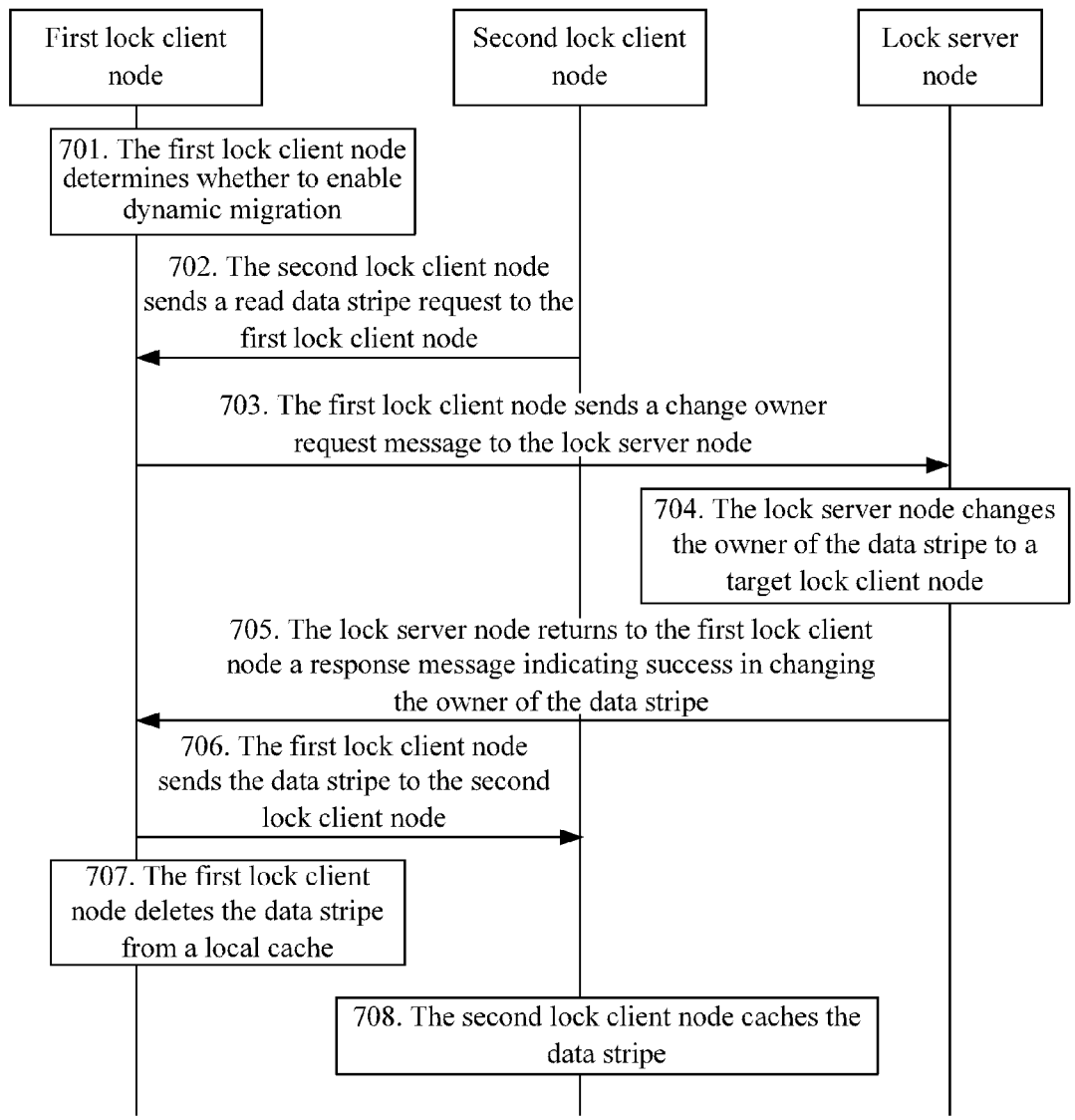
FIG. 8 is a signaling flowchart of a caching method for a distributed storage system according to Embodiment 8 of the present invention.

FIG. 8 is a signaling flowchart of a caching method for a distributed storage system according to Embodiment 8 of the present invention. In Embodiment 8 of the present invention, it is assumed that data stripes migrate dynamically between lock client nodes. In the embodiment of the present invention, when a cache is created in a global uniform cache of a lock client node, a basic rule is to cache a data stripe in a lock client node that first accesses the data stripe. However, when data stripes accessed by an application server through different lock client nodes are cached in a centralized manner in a few lock client nodes, cache deletion will occur frequently on the lock client nodes for caching, which seriously impacts the value of caching. Frequently accessed data stripes in caches are called cache hot spots. Therefore, to maintain balanced cache utilization on each storage server in the entire system, hot spots must be able to migrate dynamically between caches of the lock client nodes.

As shown in FIG. 8, the method includes the following process.

Step 701: A first lock client node determines whether to enable dynamic migration.

In this step, in a specific implementation of dynamic migration of hot spots in a global uniform cache, each lock client node determines whether a cache hot spot exists in its cache, and enables dynamic migration if the cache hot spot exists. A method for detecting whether a cache hot spot exists in the global uniform cache of the distributed storage system includes detecting periodically a cache deletion rate of each lock client node in a unit time; and when the cache deletion rate of a lock client node in a unit time exceeds a preset proportion of a total cache volume of the lock client node, defining that a cache hot spot exists in the lock client node and a hot spot migration operation is required, where the lock client node actively transfers the cache hot spot dynamically to another lock client node. For example, the preset proportion may be 20%.

The first lock client node determines whether to enable dynamic migration. When a cache deletion rate of the first lock client node in a unit time is greater than or equal to a preset proportion of a total cache volume of the first lock client node, the first lock client node determines to enable dynamic migration. In the embodiment of the present invention, it is assumed that the cache deletion rate of the first lock client node in a unit time is greater than or equal to the preset proportion of the total cache volume of the first lock client node.

An implementation manner includes setting a monitor that is connected to the lock client nodes and reporting, by each lock client node, to the monitor periodically a cache deletion rate of the lock client node in a unit time. The monitor collects cache utilization states of the lock client nodes periodically and pushes cache hot spot information to the lock client nodes, where the cache hot spot information includes IDs of lock client nodes that meet the cache hot spot condition. Each lock client node determines whether it is a cache spot hot according to whether the cache hot spot information includes an ID of the lock client node, and if it is a cache hot spot, enables a dynamic cache migration task. An execution cycle of the dynamic cache migration task is a sum of a heartbeat cycle where the lock client nodes report their deletion rates to the monitor and a cycle where the monitor obtains deletion rates of the lock client nodes. An end condition of the migration is that a current execution cycle is complete and next cache hot spot information does not include the ID of the lock client node.

Step 702: A second lock client node sends a read request on the data stripe to the first lock client node.

In this step, it is assumed that an owner of the data stripe is the first lock client node.

Step 702 is an optional step. In a first implementation manner, if the second lock client node has successfully acquired a stripe read lock upon completion of step 701, step 702 is executed first, where the second lock client node sends a read request on the data stripe to the first lock client node, and then step 703 is executed. In a second implementation manner, if the second lock client node has not successfully acquired a stripe read lock upon completion of step 701, it is unnecessary to execute step 702 and instead, step 703 is executed directly.

Step 703: The first lock client node sends a request message for owner change to a lock server node.

In this step, the first lock client node sends the request message for owner change to the lock server node, where the message includes an ID of the data stripe and an ID of a target lock client node and indicates requesting change of the owner of the data stripe to the target lock client node. That is, the first lock client node sends to the lock server node a request message for changing the owner of the data stripe to the target lock client node. In the embodiment of the present invention, it is assumed that the target lock client node is the second lock client node.

In a first implementation manner, the first lock client node generates the change owner request after receiving the read request on the data stripe from the second lock client node. In a second implementation manner, the first lock client node generates the request message for owner change actively.

Step 704: The lock server node changes the owner of the data stripe to the target lock client node.

In this step, after receiving the request message for owner change from the first lock client node, the lock server node modifies the owner information of the data stripe to change the owner of the data stripe to the target lock client node.

Step 705: The lock server node returns to the first lock client node a response message indicating success in changing the owner of the data stripe.

Step 706: The first lock client node sends the data stripe to the second lock client node.

In this step, if the above process includes step 702, in this step, the first lock client node further returns a read data success response message to the second lock client node.

Step 707: The first lock client node deletes the data stripe from a local cache.

In this step, after receiving the response message indicating success in changing the owner of the data stripe, the first lock client node deletes the data stripe from the cache of the first lock client node actively.

Step 708: The second lock client node caches the data stripe.

In this step, if the above process includes step 702, after receiving the read data success response message, the second lock client node caches the data stripe in a local global cache of the second lock client node and returns a response message to the application server. If the above process does not include step 702, the first lock client node pushes the data stripe to the local global cache of the second lock client node actively.

Figure 9:
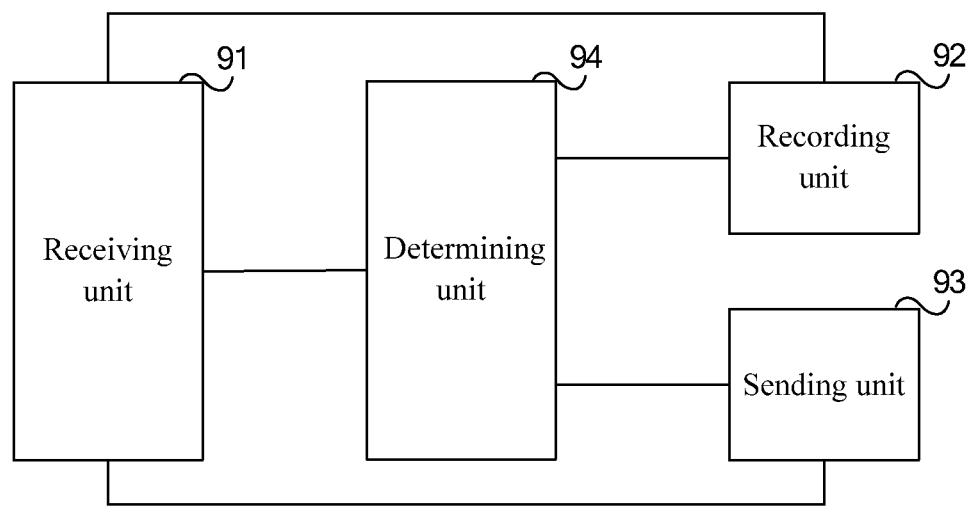
FIG. 9 is a schematic structural diagram of a data stripe owner server node according to Embodiment 9 of the present invention.

FIG. 9 is a schematic structural diagram of a data stripe owner server node according to Embodiment 9 of the present invention. As shown in FIG. 9, the data stripe owner server node at least includes a receiving unit 91, a recording unit 92, and a sending unit 93 and a determining unit 94.

The receiving unit 91 is configured to receive from a lock client node a lock notification on a data stripe.

The determining unit 94 is configured to determine the lock notification.

The recording unit 92 is configured to, when the determining unit determines that the lock notification is a read lock notification received for the first time or a write lock notification, record the lock client node as an owner of the data stripe.

The sending unit 93 is configured to, when the determining unit determines that the lock notification is a read lock notification received for the first time or a write lock notification, return to the lock client node a response message indicating that the owner of the data stripe is the lock client node, so that the lock client node caches the data stripe; and when the determining unit determines that the lock notification is a read lock notification which is not received for the first time, return to the lock client node a response message that includes owner information of the data stripe, so that the lock client node reads the data stripe from a cache of an owner of the data stripe.

On the basis of the above technical solution, further, the determining unit 94 is configured to, when the lock notification is a read lock notification, search recorded attribute information of data stripes for attribute information of the data stripe, and if the attribute information of the data stripe is not found, determine that the read lock notification is a read lock notification received for the first time.

On the basis of the above technical solution, further, the receiving unit 91 is configured to receive from the lock client node a request message for changing the owner of the data stripe to another lock client node. Correspondingly, the recording unit 92 is further configured to change the owner of the data stripe to the other lock client node. Correspondingly, the sending unit 92 is further configured to return to the lock client node a response message indicating success in changing the owner of the data stripe, so that the lock client node deletes the data stripe from a local cache and the other lock client node caches the data stripe.

On the basis of the above technical solution, further, when the data stripe owner server node is integrated with a lock server node device, the read lock notification includes a read lock request and the write lock notification includes a write lock request. Correspondingly, the sending unit 93 is further configured to return to the lock client node a lock success response message.

The data stripe owner server node in Embodiment 9 of the present invention can be configured to execute the caching method in the second to eighth embodiments of the present invention. For specific implementation processes and technical effects of the data stripe owner server node, reference may be made to the second to eighth embodiments of the present invention, and details are not described herein again.

Figure 10:
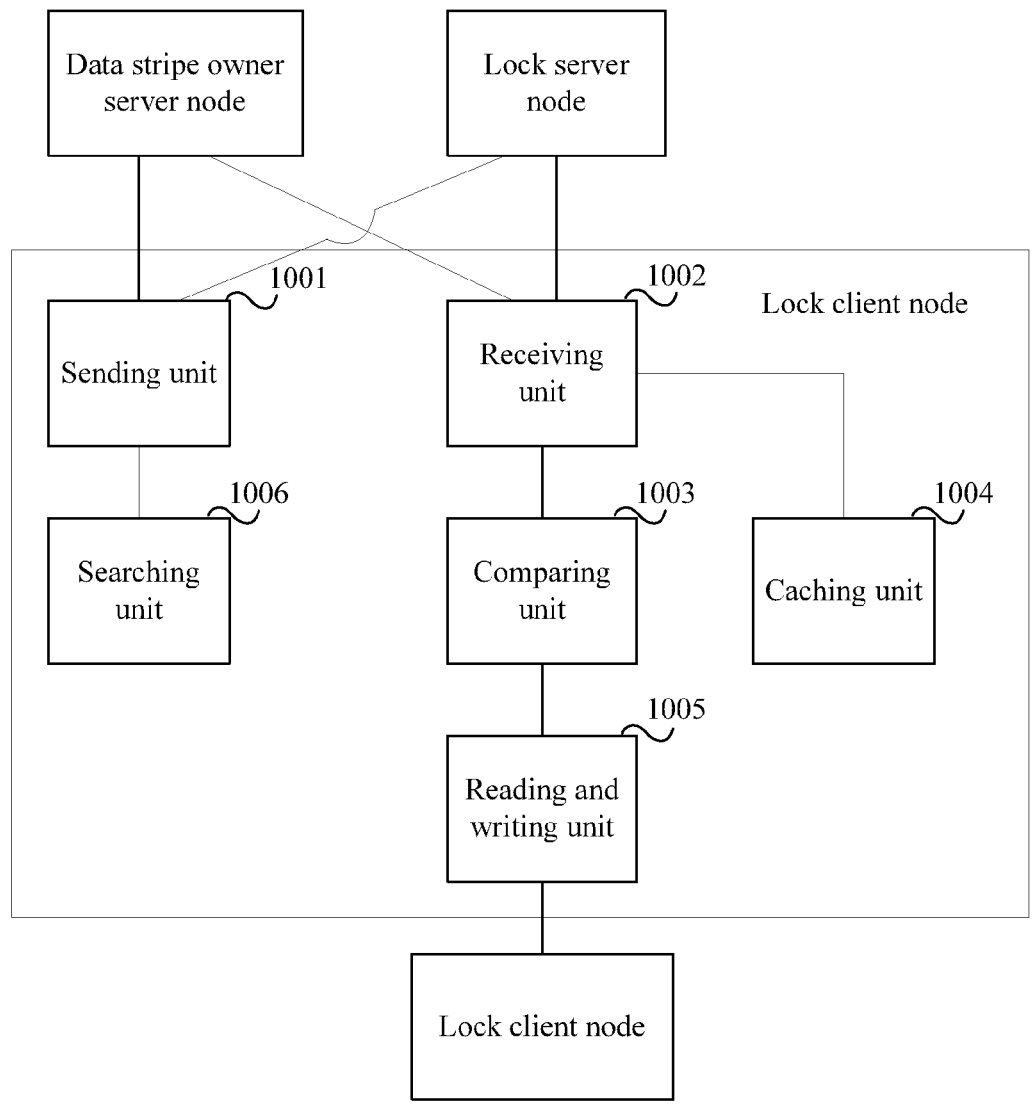
FIG. 10 is a schematic structural diagram of a lock client node according to Embodiment 10 of the present invention.

FIG. 10 is a schematic structural diagram of a lock client node according to Embodiment 10 of the present invention. As shown in FIG. 10, the lock client node at least includes a sending unit 1001, a receiving unit 1002, a comparing unit 1003, a caching unit 1004, and a reading and writing unit 1005.

The sending unit 1001 is configured to send to a data stripe owner server node a read lock notification or a write lock notification on a data stripe.

The receiving unit 1002 is configured to receive from the data stripe owner server node a response message indicating that an owner of the data stripe is the lock client node, or receive from the data stripe owner server node an ID of an owner of the data stripe.

The comparing unit 1003 is configured to compare the ID of the data stripe owner with an ID of the lock client node, and when the two IDs are different, activate the reading and writing unit 1005.

The caching unit 1004 is configured to, when the receiving unit receives from the data stripe owner server node the response message indicating that the owner of the data stripe is the lock client node, cache the data stripe.

The reading and writing unit 1005 is configured to read the data stripe from a cache of a lock client node corresponding to the ID of the data stripe owner.

On the basis of the above technical solution, further, the sending unit 1001 is configured to send a degrade lock request to a lock server node, so that the lock server node modifies a record to that the lock client node holds a read lock on the data stripe.

On the basis of above technical solution, further, the lock client node may include a searching unit 1006. Correspondingly, the receiving unit 1002 is further configured to receive from an application server a read request or a write request on the data stripe. Correspondingly, the searching unit 1006 is configured to search locally for a read lock or a write lock on the data stripe; if the read lock or the write lock on the data stripe is found, determine the owner of the data stripe according to the read lock or write lock on the data stripe, and activate the reading and writing unit 1005; and if the read lock or the write lock on the data stripe is not found, activate the sending unit 1001. Correspondingly, the reading and writing unit 1005 is further configured to read the data stripe from or write the data stripe to the owner of the data stripe.

On the basis of the above technical solution, further, the caching unit 1004 is configured to, when a deletion rate in a unit time is greater than or equal to a preset proportion of a total cache volume of the lock client node, control the sending unit 1001 to send to the data stripe owner server node a request message for changing the owner of the data stripe to a target lock client node, and further configured to, according to a response message that is received by the receiving unit 1002 and indicates success in changing the owner of the data stripe, delete the data stripe from a local cache and control the sending unit 1001 to send the data stripe to the target lock client node. Correspondingly, the sending unit 1001 is further configured to send, according to control of the caching unit 1004, to the data stripe owner server node the request message for changing the owner of the data stripe to the target lock client node, so that the data stripe owner server node changes the owner of the data stripe to the target lock client node. The sending unit 1001 is further configured to send the data stripe to the target lock client node according to control of the caching unit 1004, so that the target lock client node caches the data stripe. Correspondingly, the receiving unit 1002 is further configured to receive from the data stripe owner server node the response message indicating success in changing the owner of the data stripe.

On the basis of the above technical solution, further, the reading and writing unit 1005 is configured to send a read request on the data stripe to a lock client node corresponding to the ID of the data stripe owner, so that the lock client node corresponding to the ID of the data stripe owner searches locally cached data for the data stripe, and if the data stripe is found, returns the data stripe to the reading and writing unit 1005, and otherwise, reads data strips of the data stripe from lock client nodes in the distributed storage system, constructs the data stripe, and returns the data stripe to the reading and writing unit 1005.

The lock client node in Embodiment 10 of the present invention can be configured to execute the caching method in the second to eighth embodiments of the present invention. For specific implementation processes and technical effects of the lock client node, reference may be made to the second to eighth embodiments of the present invention, and details are not described herein again.

Figure 11:
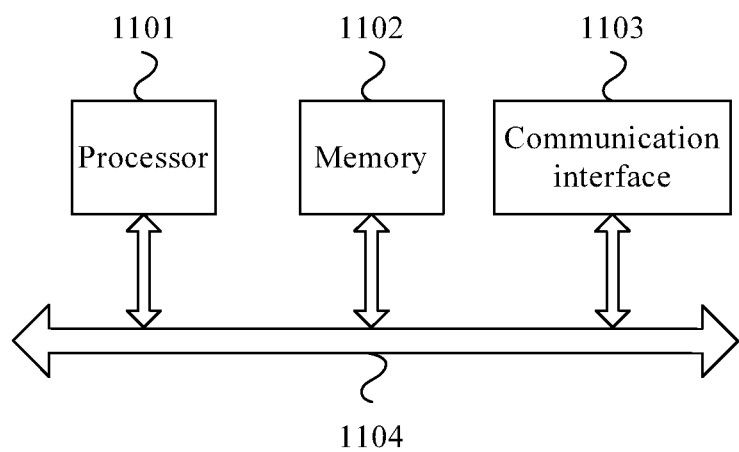
FIG. 11 is a schematic structural diagram of a data stripe owner server node according to Embodiment 11 of the present invention.

FIG. 11 is a schematic structural diagram of a data stripe owner server node according to Embodiment 11 of the present invention. As shown in FIG. 11, the data stripe owner server node at least includes a processor 1101, a memory 1102, a communication interface 1103, and a bus 1104. The processor 1101, the memory 1102, and the communication interface 1103 communicate through the bus 1104.

The memory 1102 is configured to store a program. Further, the program includes a program code which includes a computer execution instruction. The memory 1102 may be a high-speed random access memory (RAM) memory, or a non-volatile memory, for example, at least one magnetic disk memory.

The communication interface 1103 is configured to communicate with a first lock client node and a second lock client node.

The processor 1101 is configured to execute an execution instruction stored by the memory 1102, and may be a single-core or multi-core central processing unit (CPU), or an application specific integrated circuit (ASIC), or one or more integrated circuits allocated to implement the embodiments of the present invention.

When the data stripe owner server node is running, the processor 1101 runs the program to execute the following instructions: the data stripe owner server node receives from a lock client node a lock notification on a data stripe, and determines the lock notification; when the lock notification is a read lock notification received for the first time or a write lock notification, the data stripe owner server node records the lock client node as an owner of the data stripe, and returns to the lock client node a response message indicating that the owner of the data stripe is the lock client node, so that the lock client node caches the data stripe; and when the lock notification is a read lock notification which is not received for the first time, the data stripe owner server node returns to the lock client node a response message that includes owner information of the data stripe, so that the lock client node reads the data stripe from a cache of an owner of the data stripe.

The data stripe owner server node in Embodiment 11 of the present invention can be configured to execute the caching method in the second to eighth embodiments of the present invention. For specific implementation processes and technical effects of the data stripe owner server node, reference may be made to the second to eighth embodiments of the present invention, and details are not described herein again.

Figure 12:
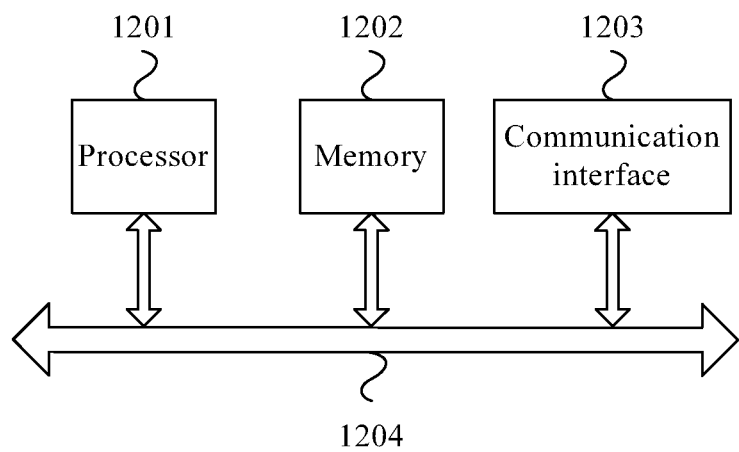
FIG. 12 is a schematic structural diagram of a lock client node according to Embodiment 12 of the present invention.

FIG. 12 is a schematic structural diagram of a lock client node according to Embodiment 12 of the present invention. As shown in FIG. 12, the lock client node at least includes a processor 1201, a memory 1202, a communication interface 1203, and a bus 1204. The processor 1201, the memory 1202, and the communication interface 1203 communicate through the bus 1204.

The memory 1202 is configured to store a program. Further, the program includes a program code which includes a computer execution instruction. The memory 1202 may be a high-speed RAM memory, or a non-volatile memory, for example, at least one magnetic disk memory.

The processor 1201 is configured to execute an execution instruction stored by the memory 1202, and may be a single-core or multi-core CPU, or an ASIC, or one or more integrated circuits allocated to implement the embodiments of the present invention.

The communication interface 1203 is configured to communicate with a data stripe owner server node and other lock client nodes.

When the lock client node is running, the processor 1202 runs the program to execute the following instructions: send a read lock notification or a write lock notification on a data stripe to the data stripe owner server node; when the lock client node receives from the data stripe owner server node a response message indicating that an owner of the data stripe is the lock client node, the lock client node caches the data stripe; and when receiving from the data stripe owner server node an ID of an owner of the data stripe, compare the ID of the data stripe owner with an ID of the lock client node, and when the two IDs are different, read the data stripe from a lock client node corresponding to the ID of the data stripe owner.

The lock client node in Embodiment 12 of the present invention can be configured to execute the caching method in the second to eighth embodiments of the present invention. For specific implementation processes and technical effects of the lock client node, reference may be made to the second to eighth embodiments of the present invention, and details are not described herein again.

Embodiment 13 of the present invention provides a computer readable medium, including a computer execution instruction used to instruct a data stripe owner server node to execute the method in Embodiment 2 of the present invention.

Embodiment 14 of the present invention provides a computer readable medium, including a computer execution instruction used to instruct a lock client node to execute the method in Embodiment 3 of the present invention. It should be noted that, for ease of description, the foregoing method embodiments are all described as combinations of actions but persons skilled in the art should know that the present invention is not limited to the described sequences of actions. According to the present invention, some steps may be executed in other sequences or executed simultaneously. Also, persons skilled in the art should know that the embodiments described herein are merely exemplary embodiments, where the actions and modules included are not mandatory for the present invention.

In the foregoing embodiments, the descriptions of the embodiments have their respective emphasis, and for a part without being described in detail in an embodiment, reference can be made to related descriptions in other embodiments.

From the foregoing description of implementation manners, persons skilled in the art may be clear that the present invention can be implemented by hardware, or firmware, or a combination thereof. When the present invention is implemented using software, the aforesaid functions may be stored in a computer readable medium or transferred as one or more instructions or codes in a computer readable medium. The computer readable medium includes a computer storage medium and a communication medium, where the communication medium includes any medium that facilitates transfer of a computer program from one place to another. The storage medium may be any available computer accessible medium. For example but without any limitation, the computer readable medium may include a RAM, a read-only memory (ROM), an Electrically Erasable Programmable ROM (EEPROM), a compact disk ROM (CD-ROM), other optical disk storages or magnetic disk storage media, other magnetic storage devices, or any other medium that can be used to carry or store desired program codes in form of instructions or data structures and can be accessed by a computer. In addition, any connection can be a computer readable medium when appropriate. For example, if software is transferred from a website, a server or other remote sources using a coaxial cable, an optical fiber cable, a twisted pair, a digital subscriber line (DSL) or wireless technologies like infrared, radio, and microwave, the coaxial cable, optical fiber cable, twisted pair, DSL or wireless technologies like infrared, radio, and microwave all fall within the definition of the medium. For example, disks and discs used in the present invention include CDs, laser discs, digital versatile discs (DVD), floppy disks, and blue-ray discs, where a disk generally replicates data magnetically and a disc replicates data optically using laser. The above combinations shall also fall within the protection scope of the computer readable medium.

What is claimed is:

1. A caching method performed by a lock server node in a distributed storage system which includes the lock server node and a plurality of lock client nodes, the method comprising:

receiving a first lock request sent by a first lock client node for locking a first data stripe, wherein the first lock request contains an identity (ID) of the first data stripe;

determining that the first lock request is a read lock request received for the first time on the first data stripe or a write lock request on the first data stripe;

recording, in recorded attribute information of data stripes stored in the distributed storage system, that the first lock client node is an owner of the first data stripe; and returning to the first lock client node a first response message indicating that the first lock client node is the owner of the first data stripe and instructing the first lock client node to cache the first data stripe;

receiving a second lock request sent by the first lock client node for locking a second data stripe, wherein the second lock request contains an ID of the second data stripe;

determining that the second lock request is a read lock request which is not received for the first time on the second data stripe; and returning to the first lock client node a second response message which contains owner information identifying an owner of the second data stripe other than the first lock client node, wherein the second response message is configured to instruct the first lock client node to obtain the second data stripe from the owner of the second data stripe.

2. The method according to claim 1, wherein the step of determining that the first lock request is the read lock request received for the first time on the first data stripe comprises:

determining that the first lock request is a read lock request; and searching the recorded attribute information of data stripes for attribute information of the first data stripe according to the ID of the first data stripe, wherein the read lock request is received for the first time on the first data stripe if the attribute information of the data stripe is not found in the recorded attribute information.

3. The method according to claim 1 further comprising:

receiving a request message, sent by the first lock client node, that requests to change the owner of the first data stripe to a second lock client node, wherein the request message contains the ID of the first data stripe and an ID of the second lock client node;

changing the owner of the first data stripe from the first lock client node to the second lock client node in the attribute information of the first data stripe according to the ID of the first data stripe and the ID of the second lock client node; and returning to the first lock client node a response message indicating success in changing the owner of the first data stripe to the second lock client node.

4. A caching method performed by a first lock client node in a distributed storage system which includes a lock server node and a plurality of lock client nodes including the first lock client node, the method comprising:

sending a first lock request to the lock server node, wherein the first lock request requests to lock a first data stripe;

receiving a first response message sent by the lock server node, the first response message containing an ID of an owner of the first data stripe;

determining that the ID of the owner of the first data stripe is an ID of the first lock client node;

obtaining data strips of the first data stripe from other lock client nodes in the distributed storage system;

constructing the first data stripe from the obtained data strips; and caching the first data stripe;

sending a second lock request to the lock server node, wherein the second lock request requests to lock a second data stripe;

receiving a second response message sent by the lock server node, the second response message containing an ID of an owner of the second data stripe;

determining that the ID of the owner of the second data stripe is not an ID of the first lock client node; and reading the second data stripe from a second lock client node identified by the ID of the owner of the second data stripe.

5. The method according to claim 4, wherein, when the first lock request is a write lock request on the first data stripe, the method further comprises:

performing a write operation on the first data stripe according to received data sent by an application server; and sending a degrade lock request to the lock server node after performing the write operation, wherein the degrade lock request instructs the lock server node to change a write lock held by the first lock client node to a read lock on the first data stripe.

6. The method according to claim 4 further comprising:

receiving from an application server a read request for the first data stripe, wherein the read request contains the ID of the first data stripe;

searching on the first lock client node for a read lock on the first data stripe according to the ID of the first data stripe, wherein lock information of data stripes which have been read or written by the first lock client node is cached by the first lock client node; and executing the step of sending the first lock request to the lock server node when the read lock on the first data stripe is not found in the lock information cached by the first lock client node.

7. The method according to claim 4 further comprising:

receiving from an application server a write request for the first data stripe, wherein the write request contains the ID of the first data stripe;

searching on the first lock client node for a write lock on the first data stripe according to the ID of the first data stripe, wherein lock information of data stripes which have been read or written by the first lock client node is cached by the first lock client node; and executing the step of sending the first lock request to the lock server node when the write lock on the first data stripe is not found in the lock information cached by the first lock client node.

8. The method according to claim 4 further comprising:

determining the first data stripe cached by the first lock client node is a cache hot spot being frequently accessed;

sending, to the lock server node, a request message that requests to change the owner of the first data stripe to a second lock client node, wherein the request message contains an ID of the second lock client node and the ID of the first data stripe;

receiving a response message indicating success in changing the owner of the first data stripe from the first lock client node to the second lock client node; and deleting the first data stripe from a cache of the first lock client node.

9. The method according to claim 4 further comprising:

receiving a read request sent by a third lock client node after caching the first data stripe, wherein the read request sent by the third lock client node contains an ID of the first data stripe;

retrieving the first data stripe in a cache according to the ID of the first data stripe; and sending the first data stripe to the third lock client node.

10. A lock server node in a distributed storage system which includes the lock server node and a plurality of lock client nodes, the lock server node comprising:

a communication interface configured to connect to the lock client nodes; and a processor configured to:

receive a first lock request sent by a first lock client node for locking a first data stripe, wherein the first lock request contains an ID of the first data stripe;

determine that the first lock request is a read lock request received for the first time on the first data stripe or a write lock request on the first data stripe;

record, in recorded attribute information of data stripes stored in the distributed storage system, that the first lock client node is an owner of the first data stripe; and return to the first lock client node a first response message indicating that the first lock client node is the owner of the first data stripe and instructing the first lock client node to cache the first data stripe;

wherein the processor is further configured to:

receive a second lock request sent by the first lock client node for locking a second data stripe, wherein the second lock request contains an ID of the second data stripe;

determine that the lock request is a read lock request which is not received for the first time on the second data stripe; and return to the first lock client node a second response message which contains owner information identifying an owner of the second data stripe other than the first lock client node, wherein the second response message is configured to instruct the first lock client node to obtain the second data stripe from the owner of the data stripe.

11. The lock server node according to claim 10, wherein the operation of determining by processor comprises:

determining that the first lock request is a read lock request; and searching the recorded attribute information of data stripes for attribute information of the first data stripe according to the ID of the first data stripe, wherein the read lock request is received for the first time on the first data stripe if the attribute information of the first data stripe is not found in the recorded attribute information.

12. The lock server node according to claim 10, wherein the processor is further configured to:

receive a request message sent by the first lock client node that requests to change the owner of the first data stripe to a second lock client node, wherein the request message contains the ID of the first data stripe and an ID of the second lock client node;

change the owner of the first data stripe from the first lock client node to the second lock client node in the attribute information of the first data stripe according to the ID of the first data stripe and the ID of the second lock client node; and return to the first lock client node a response message indicating success in changing the owner of the first data stripe to the second lock client node.

13. A lock client node in a distributed storage system which includes a lock server node and a plurality of lock client nodes, the lock client node comprising:

a communication interface configured to connect to a lock server node and other lock client nodes in the distributed storage system; and a processor configured to:

send a first lock request to the lock server node, wherein the first lock request requests to lock a first data stripe;

receive a first response message sent by the lock server node, the first response message contains an ID of an owner of the first data stripe;

determine that the ID of the owner of the first data stripe is an ID of the lock client node;

obtain data strips of the first data stripe from other lock client nodes in the distributed storage system;

construct the first data stripe according to the obtained data strips; and cache the first data stripe;

send a second lock request to the lock server node, wherein the second lock request requests to lock a second data stripe;

receive a second response message sent by the lock server node, wherein the second response message contains an ID of the owner of the second data stripe;

determine that the ID of the owner of the second data stripe is not the ID of the lock client node; and read the second data stripe from another lock client node identified by the ID of the owner of the second data stripe.

14. The lock client node according to claim 13, wherein the processor is further configured to:

perform a write operation on the first data stripe according to received data sent by an application server when the lock request is a write lock request on the first data stripe; and send a degrade lock request to the lock server node after performing the write operation, wherein the degrade lock request instructs the lock server node to change a write lock held by the lock client node to a read lock on the first data stripe.

15. The lock client node according to claim 13, wherein the processor is further configured to:

receive from an application server a read request for the first data stripe, wherein the read request contains the ID of the first data stripe;

search on the lock client node for a read lock on the first data stripe according to the ID of the first data stripe, wherein lock information of data stripes which have been read or written by the lock client node is cached by the lock client node; and execute the operation of sending the first lock request to the lock server node when the read lock on the first data stripe is not found in the lock information cached by the lock client node.

16. The lock client node according to claim 13, wherein the processor is further configured to:

receive from an application server a write request for the first data stripe, wherein the write request contains the ID of the first data stripe;

search on the lock client node for a write lock on the first data stripe according to the ID of the first data stripe, wherein lock information of data stripes which have been read or written by the lock client node is cached by the lock client node; and execute the operation of sending the first lock request to the lock server node when the write lock on the first data stripe is not found in the lock information cached by the lock client node.

17. The lock client node according to claim 13, wherein the processor is further configured to:

determine the first data stripe cached by the lock client node is a cache hot spot being frequently accessed;

send, to the lock server node, a request message that requests to change the owner of the first data stripe to another lock client node, wherein the request message contains an ID of the other lock client node and the ID of the first data stripe;

receive a response message indicating success in changing the owner of the first data stripe from the lock client node to the other lock client node; and delete the first data stripe from a cache of the lock client node.

18. The lock client node according to claim 13, wherein the processor is further configured to:

receive a read request sent by another lock client node after the operation of caching the first data stripe, wherein the read request sent by the other lock client node contains an ID of the first data stripe;

retrieve the first data stripe in a cache according to the ID of the first data stripe; and send the first data stripe to the other lock client node.

* * * * *